United States Patent Office 3,132,130
Patented May 5, 1964

3,132,130
HEAVY METAL-CONTAINING AZO DYESTUFFS
Fabio Beffa and Guido Schetty, Basel, Switzerland, assignors to J. R. Geigy A.-G., Basel, Switzerland
No Drawing. Filed Oct. 11, 1960, Ser. No. 61,837
Claims priority, application Switzerland Oct. 12, 1959
7 Claims. (Cl. 260—147)

The present invention concerns heavy metal-containing azo dyestuffs processes for the production thereof, their use for the fast dyeing of organic materials and, as industrial products, the material dyed with the aid of these dyestuffs.

It has been found that valuable dyestuffs are obtained if an amine of the general Formula I

(I)

wherein A represents a radical of the benzene series free from water solubilising groups, Acyl$_1$ and Acyl$_2$ represent acid radicals which are derived from oxygen acids of hexavalent sulphur containing organic radicals and in which formula the amino and the amido group are in o-position to each other, is diazotised, the diazonium compound is coupled with an azo component coupling in o-position to a group capable of forming the metal complex, then the one acyl radicals of the diacylamido group in the coupling product is split off in an alkaline medium and an agent introducing chromium or cobalt is reacted with the reaction product, the components being so chosen that there are no salt-forming substituents in the end product which dissociate acid in water and that there are neither alkylsulphonyl nor sulphonic acid amide groups as substituents at those radicals of the diazo and coupling components which are bound direct to the azo group.

The radical A of the diazo component can contain the non-water solubilising substituents usual in azo dyestuffs, for example, halogen, low acylamino, alkyl and alkoxy groups. Preferred diazo components used according to the invention are those the radical A of which is a benzene radical possibly substituted by low alkyl and/or alkoxy groups.

Radicals of organic sulphonic acids and sulphamic acids of secondary organic amines are employed as acyl radicals of the diacylamido group. These are advantageously the radicals of low aliphatic sulphonic acids, for example, methyl, chloromethyl, ethyl and propyl sulphonic acids. Also the radicals of monocyclic aryl sulphonic acids can form the diacylamido group such as, e.g. radicals of benzene, toluene and chlorobenzene sulphonic acids, in particular benzene sulphonic acid radicals the benzene nuclei of which contain at least one water solubilising sulphonyl substituent not dissociating acid in water, for example, the methyl, chloromethyl or ethyl sulphonyl group or sulphonic acid amide groups.

Acyl$_1$ and Acyl$_2$ can be identical or different, advantageously however, they are identical.

The o-diacylamidoaminobenzene compounds used according to the invention are obtained by diacylating the corresponding o-nitroaminobenzenes and subsequently reducing the nitro group to the amino group. For this purpose, the amine is condensed with 2 mols of a reactive derivative of a sulphonic acid or with 1 mol of each of two such different sulphonic acid derivatives. The reaction is performed advantageously in the presence of a tertiary nitrogen base and possibly in the presence of an organic solvent; most simply it is performed by treating the amine with the sulphonic acid chloride or bromide in excess pyridine bases. The nitro group is reduced, for example, in a neutral medium with catalytically activated hydrogen or in a weakly acid medium according to Béchamp.

The amines of the general Formula I are diazotised either with alkali nitrite in aqueous/mineral acid solution or suspension possibly in the presence of a low fatty acid or also in the presence of a polar organic solvent, or, if necessary, they are diazotised in concentrated sulphuric acid with nitrosyl sulphuric acid.

In the process according to the invention, those azo components are employed which are usual in the production of heavy metal-containing azo dyestuffs containing no sulphonic acid groups. These are principally acylacetic acid-N-alkyl and N-aryl amides; hydroxybenzene, hydroxynaphthalene, aminonaphthalene or hydroxyquinoline compounds coupling in o-position to a hydroxyl or amino group, also barbituric acid and 5-hydroxy- or 5-aminopyrazoles coupling in the 4-position. The aromatic radicals of these azo components can contain the substituents usual in azo dyestuffs insofar as they are within the defined limits, namely alkyl, cycloalkyl, aralkyl and acyl groups, halogen, cyano and trifluoromethyl groups, alkoxy and aryloxy groups, acylamino, alkylamino, aralkylamino and arylamino groups, arylazo groups, alkyl and aryl carbonyl and arylsulphonyl groups, sulphonic acid amide groups and sulphonic acid amide groups organically substituted at the nitrogen atom, the latter two groups not being bound directly to radicals of the azo component which are bonded directly to the azo bridge, in conformity wtih the limitation given hereinbefore.

The azo components are coupled with the o-diacylamido diazonium compounds under the conditions usual for these compounds. Then one of the two acyl groups in the coupling products is split off in an alkaline medium. For this purpose, the o-diacylamino-azo dyestuffs are treated in aqueous or aqueous/organic medium with dilute alkalies or alkali carbonates such as, e.g. lithium, sodium or potassium hydroxide or carbonate. This is done at an elevated temperature if necessary. In general this partial hydrolysis occurs very quickly, mostly even at room temperature. Often it is not necessary to split off the one acyl group in a separate reaction step. If azo components which couple in an alkaline medium are used, then the acyl group can sometimes be split off at the same time as the coupling is performed or immediately afterwards in the same reaction medium. Again, it is frequently possible to perform the partial saponification simultaneously with the metallisation, for example if the latter is performed in an alkaline medium.

The usual agents introducing chromium or cobalt are used to metallise the o-acylamino azo dyestuffs under the conditions usual for the metallisation of o,o'-dihydroxy azo dyestuffs or o-hydroxy-o'-amino- or -carboxy-azo dyestuffs. It is possible to produce both symmetrical and unsymmetrical, so-called 1:2 chromium or cobalt complex compounds. Symmetrical compounds are obtained by treating the o-acylamino azo dyestuffs with an agent introducing chromium or cobalt in a weakly acid, neutral or alkaline medium at temperatures of 60–140°, if necessary under pressure. In this case the agents introducing heavy metal are used in such amounts that there is at least ½ gram atom heavy metal per mol dyestuff. 1:2 chromium or cobalt complex compounds having unsymmetrical basis dyestuffs are obtained under similar conditions on using a mixture of different metallisable dyestuffs of which at least one must be the same as an o-acylamino azo dyestuff produced according to the invention. The unsymmetrical heavy metal complex compounds are obtained in a more pure form if 1 mol of a metallisable dyestuff is added to 1 mol of a so-called 1:1 heavy metal complex of another dyestuff, but one of the basis dyestuffs must be an o-acylamino dyestuff.

In its broadest aspect, our invention is concerned with metalliferous dyestuffs containing co-ordinated with a metal selected from the group consisting of chromium and cobalt, at least one molecule of a monoazo dye of the general formula

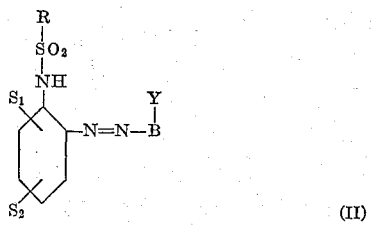

(II)

wherein

R represents a member selected from the group consisting of lower aliphatic, phenyl, chlorophenyl, lower alkylphenyl, lower alkoxyphenyl, lower alkylsulphonylphenyl, sulphamylphenyl and N-lower alkylsulphamylphenyl radicals, $S_1$ and $S_2$ each represent a member selected from the group consisting of hydrogen, chlorine, lower alkyl and lower alkoxy, B represents the radical of a coupling component attached to the azo group at an adjacent position to Y, being a member selected from the group consisting of lower alkylphenyl radicals; lower fatty acid acylaminophenyl radicals; lower alkyl lower fatty acid acylaminophenyl radicals; naphthyl radicals; lower fatty acid acylaminonaphthyl radicals; lower alkyl sulphonic acid acylaminonaphthyl radicals; 3-lower alkyl-, 3-carbamyl, 3 - N - lower alkylcarbamyl-, 1-hydrogen-pyrazolyl-(4), -1-phenyl-pyrazolyl-(4), -1-chlorophenyl-pyrazolyl-(4) and -1-lower alkylphenyl-pyrazolyl-(4) radicals; N-cyclohexyl-, N-phenyl-, N-lower alkylphenyl-, N-lower alkoxyphenyl-, N-chlorophenyl - acetoacetic acid amide radicals; and Y represents a member selected from the group consisting of hydroxy, primary amino and secondary amino radicals.

The dyestuffs produced according to the invention are worked up and isolated in the usual manner. Either yellow, orange, red, brown, blue or grey heavy metal-containing dyestuffs are obtained depending on the heavy metal and the type of the diazo and azo components employed. These complex heavy metal compounds of o-acylamino-o'-hydroxy- or o-acylamino-o'-amino azo dyestuffs are so stable that they can be used in the same way as those of o,o'-dihydroxy azo dyestuffs for the dyeing of the most various organic materials. The dyestuffs which are difficultly soluble or insoluble in water can be used, for example, for dyeing lacquers, varnishes or acetyl cellulose spinning masses. The particularly valuable water soluble dyestuffs, the water solubility of which can be aided, if desired, by mixing with anion active or nonionogenic wetting or dispersing agents or reduction additives, can be used for the dyeing and printing of textile material containing polypeptide groups of natural or synthetic origin. They have good affinity to such material and are generally completely drawn onto such material even from a neutral or weakly acid bath.

Those chromium and cobalt complexes of o-acylamino azo dyestuffs obtained according to the invention which correspond to Formula III

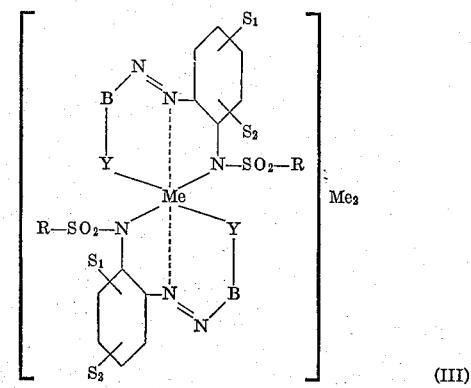

(III)

the acyl group of which is derived from a low aliphatic sulphonic acid are particularly suitable for textile dyeing purposes and are, therefore, preferred. In this formula:

$Me_1$ represents a member selected from the group consisting of chromium and cobalt, $Me_2$ is a cation selected from the group consisting of hydrogen, alkali metal and ammonium, R represents a member selected from the group consisting of lower alkyl and lower chloroalkyl, and $S_1$ and $S_2$, B and Y have the meanings given above.

Also dyestuffs the acylamido group of which contains a monocyclic arylsulphonic acid produce wool dyeings which are fast to wet and light. Of these, those chromium- and cobalt-containing acylamino azo dyestuffs containing an acyl radical derived from a benzene sulphonic acid, the benzene nucleus of which contains at least one non-ionogenic sulphenyl substituent, are suitable and, therefore, are preferred for wool dyeing.

The dyeings obtained with dyestuffs according to the invention on textile material containing polypeptide groups, in particular on wool, have very good fastness to light and rubbing, good fastness to washing, sea water, decatising and alkali and they are also distinguished by their evenness.

The following examples illustrate the invention. Where not otherwise stated, parts are given therein as parts by weight. The temperatures are in degrees centigrade. The relationship of parts by weight to parts by volume is as that of kilogrammes to litres.

*Example 1*

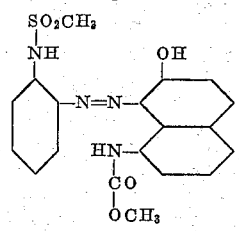

2:1 chromium complex 26.4 parts of N-di-(methylsulphonyl)-amino-2-aminobenzene are dissolved in a mixture of 50 parts of glacial acetic acid, 35 parts of concentrated hydrochloric acid and 50 parts of warm water and the solution is quickly diazotised at 0–5° with 16.6 parts by volume of 33.3% sodium nitrite solution. The acid solution of the diazonium compound is added dropwise while stirring to a solution of 22.2 parts of 1-carbomethoxyamino-7-hydroxynaphthalene in 300 parts of water and 4.2 parts of sodium hydroxide in the presence of such an amount of soda ash that, after the addition of the diazonium compound, the dyestuff suspension has a weakly phenolphthalein alkaline reaction. On completion of the coupling, the precipitated dyestuff is filtered off and dried. It is then suspended in 250 parts by volume of glycol monomethyl ether and saponified at room temperature with 30 parts by volume of 10 N-caustic soda lye. Some of the red-orange dyestuff dissolves and the colour changes to violet. The dyestuff suspension is then stirred for some hours at room temperature and the reaction mixture is afterwards neutralised by the addition of acetic acid. The saponified dyestuff is then refluxed for several hours with 220 parts of a solution of the sodium salt of disalicylate chromic acid (corresponding to 2.86 parts of chromium), until the metallisation is complete. The chromium-containing dyestuff is precipitated by the addition of a sodium chloride solution, filtered off and dried. The sodium salt of the dyestuff is a dark powder which dyes wool from a neutral or weakly acid bath in very level, grey shades. The dyeings have very good wet fastness properties and excellent fastness to light.

If, instead of the sodium derivative, this example is performed with potassium reactants such as potassium hydroxide, potassium carbonate or potassium chloride, then the potassium salt of the dyestuff is obtained. It also dyes wool in fast grey shades.

A similar but somewhat more reddish dyestuff is obtained if 20.5 parts of 1-acetylamino-7-hydroxynaphthalene are used instead of 1-carbomethoxyamino-7-hydroxynaphthalene.

*Example 2*

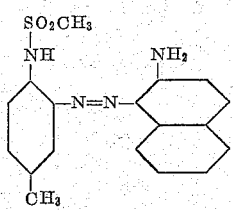

2 : 1 cobalt complex 27.8 parts of N-di-(methylsulphonyl)-amino-4-methyl-2-aminobenzene are diazotised as described in Example 1 and traces of excess nitrous acid are decomposed with sulphamic acid. The mineral acid in the solution of the diazonium compound is then buffered until Congo red paper is no longer coloured blue. The diazo compound is mixed at 30–35° with a warm solution of 15 parts of 2-aminonaphthalene in 250 parts of water and 100 parts of acetic acid. On completion of the dyestuff formation, it is diluted with water, the precipitated dyestuff is filtered off, washed in cold water and dried. The dyestuff is then heated on a water bath with 250 parts by volume of formamide, 15 parts of cobalt acetate (corresponding to 3.54 parts of cobalt) and 8.4 parts of sodium hydroxide (as 10 N-solution), until the complex formation is complete. 20% sodium chloride solution is then added to the dark melt and the mixture is stirred until the cobalt-containing dyestuff has precipitated. The dyestuff is then filtered off, washed with dilute sodium chloride solution and dried. After drying, the dyestuff is a black powder which dyes wool from a neutral or weakly acid bath in reddish-grey shades. The dyeings have good fastness properties.

If in the above example, the N-di-(methylsulphonyl)-amino-4-methyl-2-aminobenzene is replaced by 29.4 parts of N-di-(methylsulphonyl)-amino-4-methoxy-2-aminobenzene or by 26.4 parts of N-di-(methylsulphonyl)-amino-2-aminobenzene, then dyestuffs having similar properties are obtained.

*Example 3*

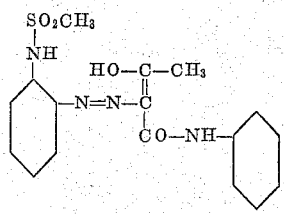

2 : 1 cobalt complex 26.4 parts of N-di-(methylsulphonyl)-amino-2-aminobenzene are diazotised as described in Example 1 and coupled with 18.1 parts of acetoacetic acid anilide. On completion of the coupling, the partly precipitated dyestuff is completely precipitated by the addition of sodium chloride. After filtering, to saponify the dyestuff it is suspended in 250 parts by volume of glycol monomethyl ether and stirred for several hours at 25–30° with the addition of sufficient 10 N-caustic soda lye to ensure that the strongly alkaline reaction is maintained until the end of the saponification. The saponified dyestuff is diluted with cold water and precipitated with acetic acid. It is filtered off and dried. It is metallised by heating it on a water bath in 250 parts of formamide with 15 parts of cobalt acetate (corresponding to 3.54 parts of cobalt), until the complex formation is complete. 20% sodium chloride solution is then added to the yellow-brown melt and the whole is stirred until the cobalt-containing dyestuff has precipitated. It is filtered off, washed with dilute sodium chloride solution and dried. After drying, the dyestuff is obtained as a yellow-brown powder. It dyes wool from a neutral or weakly acid bath in yellow shades having good general fastness properties.

If in the above example, the acetoacetic acid anilide is replaced by 21.6 parts of acetoacetic acid-3-chloranilide or by acetoacetic acid-2-chloranilide or by 18.7 parts of acetoacetic acid cyclohexylamide or by 21.6 parts of acetoacetic acid-4-chloranilide, then dyestuffs having similar properties are obtained.

*Example 4*

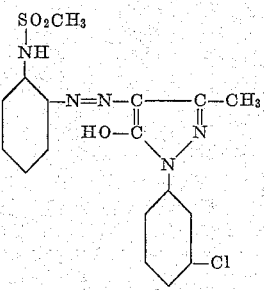

2 : 1 chromium complex 26.4 parts of N-di-(methylsulphonyl)-amino-2-aminobenzene are diazotised as described in Example 1. The diazonium compound so obtained is added dropwise to a solution of 21.3 parts of 1-(3'-chlorophenyl)-3-methyl-5-pyrazolone in 300 parts of water and 4.2 parts of sodium hydroxide, the coupling being performed with the simultaneous addition of sufficient caustic soda lye to ensure that after addition of the diazonium component, the reaction mixture has a weakly phenolphthalein alkaline reaction. An acyl group is split off by the addition of sodium hydroxide and heating of the yellow reaction mixture for several hours at 70–75°. The orange dyestuff, the greater part of which has precipitated, is quantitatively precipitated, after neutralising the excess caustic soda lye by the addition of hydrochloric acid. It is filtered off and, in a mixture of 100 parts by volume of glycol monomethyl ether and 100 parts of water, refluxed with 220 parts by volume of a solution of the sodium salt of disalicylato chromic acid (corresponding to 2.86 parts of chromium) until the metallisation is complete. The chromium-containing dyestuff is precipitated by the addition of sodium chloride, then filtered off and dried. It is an orange red powder which dyes wool from a neutral or weakly acid bath in level, fast to light orange shades. The dyeings have very good fastness to light.

If in the above example, the 1-(3'-chlorophenyl)-3-methyl-5-pyrazolone is replaced by 17.8 parts of 1-phenyl-3-methyl-5-pyrazolone or by 21.3 parts of 1-(2'-chlorophenyl)-3-methyl-5-pyrazolone, then a dyestuff having similar properties is obtained.

*Example 5*

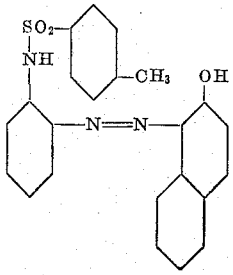

2 : 1 chromium complex 41.6 parts of N-di-(p-toluene sulphonyl)-amino-2-aminobenzene are stirred into 300 parts by volume of glacial acetic acid and dissolved to a great extent by the addition of 35 parts of concentrated hydrochloric acid. The mixture is diazotised at room temperature with sodium nitrite and the excess mineral acid is then buffered by the addition of sodium acetate.

14.7 parts of 2-hydroxynaphthalene in 100 parts by volume of glacial acetic acid are then added to the diazonium compound. The formation of the dyestuff is completed by heating for 2 hours at 50°. The orange dyestuff is filtered off and washed with cold water. The dyestuff obtained is saponified by suspending it in 300 parts by volume of ethyl alcohol and adding the necessary amount of 10 N-caustic soda lye at 70–80°. After stirring for 6 hours at the boil, the dyestuff is precipitated by diluting with cold water. It is filtered off, washed with water and dried. The saponified product in 300 parts by volume of formamide is dissolved to a great extent with 10 parts by volume of 10 N-caustic soda lye, 12 parts of chromic acetate (corresponding to 2.86 parts of chromium) are added and the whole is kept at 95–105° until the complex formation is complete. After diluting with saturated sodium chloride solution, the chromium-containing dyestuff is precipitated and then isolated. After drying, it is a dark powder which dyes wool in fast, violety-bordeaux shades.

If in the above example, the N-di-(p-toluene sulphonyl)-amino-2-aminobenzene is replaced by 38.8 parts of N-di-(benzene sulphonyl)-amino-2-aminobenzene, then a similar dyestuff is obtained.

*Example 6*

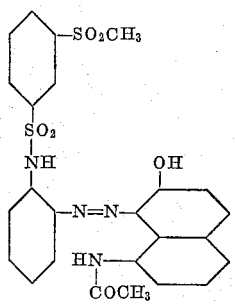

2 : 1 chromium complex 54.4 parts of N-di-(3'-methylsulphonylbenzene sulphonyl)-amino-2-aminobenzene are added at 0–10° while stirring well to 74 parts of 18.3% nitrosyl sulphuric acid. The pale brown suspension is then dissolved while stirring well in ice water. The clear solution of the diazonium compound is then coupled as described in Example 4 with a solution of 20.5 parts of 1-acetylamino-7-hydroxynaphthalene in 200 parts of water and 4.2 parts of sodium hydroxide, sufficient caustic soda lye being simultaneously added to ensure that after the addition of the diazonium component, the reaction mixture has a weakly phenolphthalein alkaline reaction. The dyestuff precipitates practically quantitatively. On completion of the dyestuff formation, it is filtered off and washed with cold water. To saponify, the red dyestuff so obtained is suspended in 300 parts by volume of a mixture of water and glycol monomethyl ether 1:1, the reaction is made alkaline to mimosa paper by the addition of the necessary amount of 10 N-caustic soda lye and the mixture which has a mimosa alkaline reaction is stirred for several hours at 25–30°. The saponified dyestuff is violet and precipitates quantitatively. After drying, it is suspended in 250 parts by volume of formamide and heated for several hours at 105–110° with 12 parts of chromic acetate (corresponding to 2.86 parts of chromium) until the complex formation is complete. The chromium-containing dyestuff is precipitated by the addition of sodium chloride solution, then filtered off and dried. It is a dark powder which dyes wool from a neutral or weakly acid bath in grey shades. The dyeings are very wet fast and have excellent fastness to light.

If in the above example, the 1-acetylamino-7-hydroxynaphthalene is replaced by 22.2 parts of 1-carbomethoxyamino-7-hydroxynaphthalene, then a dyestuff having similar properties is obtained.

*Example 7*

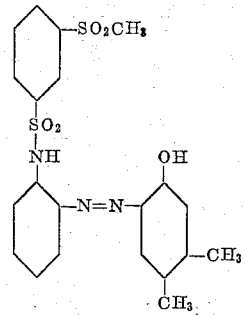

2 :1 cobalt complex 54.4 parts of N-di-(3'-methylsulphonylbenzenesulphonyl)-amino-2-aminobenzene are diazotised as described in Example 6 and coupled with 12.5 parts of 3,4-dimethyl-1-hydroxybenzene. The dyestuff obtained is then heated with 250 parts by volume of formamide, 15 parts of cobalt acetate (corresponding to 3.54 parts of cobalt) and 30 parts by volume of 10 N-caustic soda lye on a water bath until the complex formation is complete. The saturated sodium chloride solution is then added to the dark melt and the whole is stirred until the cobalt-containing dyestuff has precipitated. It is filtered off, washed with dilute sodium chloride solution and dried. After drying, it is a dark powder which dyes wool from a neutral or weakly acid bath in fast brown shades.

*Example 8*

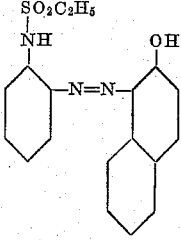

2 :1 cobalt complex 29.2 parts of N-di-(ethylsulphonyl)-amino-2-aminobenzene are dissolved in a mixture of 50 parts of glacial acetic acid, 35 parts of concentrated hydrochloric acid and 50 parts of warm water and the solution is quickly diazotised at 0–5° with 16.6 parts by volume of 33.3% sodium nitrite solution. The acid solution of the diazonium compound is added dropwise while stirring to a solution of 14.7 parts of 2-hydroxynaphthalene in 300 parts of water and 4.2 parts of sodium hydroxide in the presence of such an amount of sodium carbonate that on completion of the addition the diazonium compound of the dyestuff suspension has a weakly phenolphthalein alkaline reaction.

On completion of the coupling, the precipitated dyestuff is filtered off and dried. The dyestuff is then heated on a water bath with 250 parts by volume of formamide, 15 parts of cobalt acetate (corresponding to 3.54 parts of cobalt) and 8.4 parts of sodium hydroxide (as 10 N-solution) until the complex formation is complete. 20% sodium chloride solution is added to the dark melt and the mixture is stirred until the cobalt-containing dyestuff has precipitated. This is then filtered off, washed with dilute sodium chloride solution and dried. After drying, the dyestuff is a dark powder which dyes wool from a neutral or weakly acid bath in fast Bordeaux red shades.

The following table contains further dyestuffs according to the invention which are produced by the processes described in Examples 1 to 8 by diazotising equivalent amounts of the diazo components Nos. 1–58 and coupling with the equivalent amount of the coupling components given and then metallising the dyestuffs obtained.

| No. | Diazo component | Coupling component | Metal | Shade on wool |
|---|---|---|---|---|
| 1 | 1-N-di-(methylsulphonyl)-amino-2-aminobenzene. | 2-hydroxynaphthalene. | Cr | Violet. |
| 2 | ----do---- | ----do---- | Co | Brownish Bordeaux. |
| 3 | ----do---- | 1-(3'-chlorophenyl)-3-methyl-5-pyrazolone. | Co | Brownish yellow. |
| 4 | ----do---- | 3,4-dimethyl-1-hydroxybenzene. | Co | Brown. |
| 5 | ----do---- | ----do---- | Cr | Violety brown. |
| 6 | ----do---- | 1-acetylamino-7-hydroxynaphthalene. | Co | Raisin. |
| 7 | ----do---- | 1-propionylamino-7-hydroxynaphthalene. | Cr | Grey. |
| 8 | ----do---- | ----do---- | Co | Raisin. |
| 9 | ----do---- | 1-carbethoxyamino-7-hydroxynaphthalene. | Cr | Grey. |
| 10 | ----do---- | 1-carbopropoxyamino-7-hydroxynaphthalene. | Cr | Do. |
| 11 | ----do---- | 1-ethoxyacetylamino-7-hydroxynaphthalene. | Cr | Do. |
| 12 | ----do---- | 1-carbobutoxyamino-7-hydroxynaphthalene. | Cr | Do. |
| 13 | ----do---- | 1-methoxyethylcarbamino-7-hydroxynaphthalene. | Cr | Do. |
| 14 | ----do---- | 1-carbomethoxyamino-6-hydroxynaphthalene. | Cr | Violet. |
| 15 | ----do---- | ----do---- | Co | Violety brown. |
| 16 | ----do---- | 5,6,7,8-tetrahydro-2-hydroxynaphthalene. | Co | Brown. |
| 17 | ----do---- | ----do---- | Cr | Reddish brown. |
| 18 | ----do---- | 1-methylsulphonylamino-7-hydroxynaphthalene. | Cr | Grey. |
| 19 | ----do---- | ----do---- | Co | Raisin. |
| 20 | 1-N-di-(ethylsulphonyl)-amino-2-aminobenzene. | p-Cyclohexylphenol. | Co | Brown. |
| 21 | ----do---- | ----do---- | Cr | Violety brown. |
| 22 | ----do---- | 1-phenyl-3-methyl-5-aminopyrazole. | Co | Yellowish brown. |
| 23 | 1-N-di-(methylsulphonyl)-amino-4-methyl-2-aminobenzene. | 1-carbomethoxyamino-7-hydroxynaphthalene. | Cr | Grey. |
| 24 | ----do---- | 1-acetylamino-7-hydroxynaphthalene. | Cr | Do. |
| 25 | 1-N-di-(methylsulphonyl)-amino-4-methoxy-2-aminobenzene. | 1-carbomethoxyamino-7-hydroxynaphthalene. | Cr | Do. |
| 26 | ----do---- | 1-acetylamino-7-hydroxynaphthalene. | Cr | Do. |
| 27 | ----do---- | ----do---- | Co | Raisin. |
| 28 | 1-N-di-(methylsulphonyl)-amino-4-chloro-2-aminobenzene. | 1-methylsulphonylamino-7-hydroxynaphthalene. | Cr | Grey. |
| 29 | ----do---- | ----do---- | Co | Grey-violet. |
| 30 | 1-N-di-(p-toluene sulphonyl)-amino-2-amino-benzene. | 1-acetylamino-7-hydroxynaphthalene. | Cr | Grey. |
| 31 | ----do---- | ----do---- | Co | Raisin. |
| 32 | ----do---- | 1-carbomethoxyamino-7-hydroxynaphthalene. | Cr | Grey. |
| 33 | ----do---- | 2-hydroxynaphthalene. | Co | Brownish Bordeaux. |
| 34 | 1-N-di-(3'-methylsulphonylbenzenesulphonyl)-amino-2-aminobenzene. | 1-carboethoxyamino-7-hydroxynaphthalene. | Cr | Grey. |
| 35 | ----do---- | 1-chloromethylsulphonylamino-7-hydroxynaphthalene. | Cr | Do. |
| 36 | 1-N-di-(benzene sulphonyl)-amino-2-aminobenzene. | 2-methylaminonaphthalene. | Co | Do. |
| 37 | ----do---- | 3-methyl-5-pyrazolone. | Cr | Orange. |
| 38 | ----do---- | ----do---- | Co | Yellow. |
| 39 | 1-N-di-(3'-amidosulphonylbenzenesulphonyl)-amino-2-aminobenzene. | 2-ethylaminonaphthalene. | Co | Grey. |
| 40 | ----do---- | 1-phenyl-3-methyl-5-pyrazolone. | Cr | Orange. |
| 41 | ----do---- | ----do---- | Co | Yellow. |
| 42 | ----do---- | Acetoacetic acid-4-ethoxyanilide. | Co | Do. |
| 43 | 1-N-di-(3'-ethylamidosulphonylbenzenesulphonyl)-amino-2-aminobenzene. | 1-(2'-chloro-6'-methylphenyl)-pyrazolone-3-carboxylic acid amide. | Cr | Red. |
| 44 | ----do---- | 1-(3'-chlorophenyl)-pyrazolone-3-carboxylic acid methylamide. | Cr | Do. |
| 45 | 1-N-di-(3'-dimethylamidosulphonylbenzenesulphonyl)-amino-2-aminobenzene. | 1-(2'-chloro-6'-methylphenyl)-pyrazolone-3-carboxylic acid amide. | Cr | Do. |
| 46 | ----do---- | 1-(3'-chlorophenyl)-pyrazolone-3-carboxylic acid ethylamide. | Cr | Do. |
| 47 | 1-N-di-(4'-chlorobenzenesulphonyl)-amino-2-aminobenzene. | Pyrazolone-3-carboxylic acid amide. | Cr | Do. |
| 48 | ----do---- | Pyrazolone-3-carboxylic acid methylamide. | Cr | Do. |

| No. | Diazo component | Coupling component | Metal | Shade on wool |
|---|---|---|---|---|
| 49 | 1-N-di-(4'-methoxybenzene sulphonyl)-amino-2-aminobenzene. | 2-acetylamino-4-methyl-1-hydroxybenzene. | Cr | Brown. |
| 50 | ---do--- | ---do--- | Co | Do. |
| 51 | ---do--- | Pyrazolone-3-carboxylic acid amide. | Cr | Red. |
| 52 | ---do--- | Pyrazolone-3-carboxylic acid ethylamide. | Cr | Do. |
| 53 | 1-N-di-(3'-methylsulphonyl-benzenesulphonyl)-amino-2-aminobenzene. | 1-phenyl-3-methyl-5-aminopyrazole. | Co | Yellowish brown. |
| 54 | ---do--- | Acetoacetic acid-4-methoxyanilide. | Co | Yellow. |
| 55 | ---do--- | Acetoacetic acid anilide. | Co | Do. |
| 56 | ---do--- | Acetoacetic acid-4'-methylanilide. | Co | Do. |
| 57 | ---do--- | Acetoacetic acid-2'-methylanilide. | Co | Do. |
| 58 | ---do--- | Acetoacetic acid cyclohexylamide. | Co | Do. |

Example 9

4 parts of the chromium-containing dyestuff obtained according to Example 1 are dissolved in 4000 parts of water and 100 parts of previously wetted wool are introduced into the dyebath at 40–50°. The bath is brought to the boil within half an hour, kept boiling for 45 minutes and then the wool is rinsed with cold water and dried. The grey dyeing so obtained has good general wet fastness properties and very good fastness to light.

What we claim is:

1. Metalliferous dyestuff containing co-ordinated with a metal selected from the group consisting of chromium and cobalt at least one molecule of monoazo dye of the formula

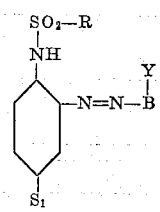

wherein
R is a member selected from the group consisting of lower aliphatic, phenyl, chlorophenyl, lower alkylphenyl, lower alkoxyphenyl, lower alkylsulphonylphenyl, sulphamylphenyl and N-lower alkylsulphamylphenyl,
$S_1$ is a member selected from the group consisting of hydrogen, chlorine, lower alkyl and lower alkoxy,
B is the radical of a coupling component attached to the azo group at an adjacent position to Y, being a member selected from the group consisting of lower alkylphenyl; cyclohexylphenyl; lower fatty acid acylaminophenyl; lower alkyl-lower fatty acid acylaminophenyl; naphthyl; 8-(lower alkylsulphonyl-aminonaphthyl; 5-(lower alkoxy-carbonyl amino)-naphthyl; 8-lower alkoxy-carbonyl-amino)-naphthyl; lower alkoxy - lower alkyl - carbonyl - aminonaphthyl; 5,6,7,8 - tetrahydronaphthyl; 3 - lower alkyl-, 3-carbamyl- 3-N-lower alkylcarbamyl-1-hydrogen - pyrazolyl - (4), -1 - phenyl - pyrazolyl-(4), -1 - chlorophenyl - pyrazolyl - (4) and -1 - lower alkylphenyl-pyrazolyl-(4); and N-cyclohexyl-, N-phenyl-, N-lower alkylphenyl-, N-lower alkoxyphenyl- and N-chlorophenyl-acetoacetic acid amido; and
Y is a member selected from the group consisting of hydroxy, $NH_2$, methylamino and ethylamino; said metalliferous dyestuff being free from salt-forming substituents which dissociate acid in water.

2. The dyestuff of the formula:

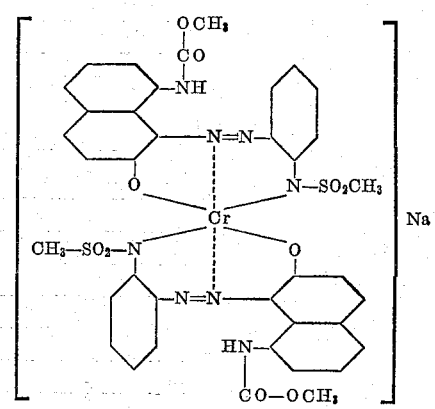

3. The dye of the formula

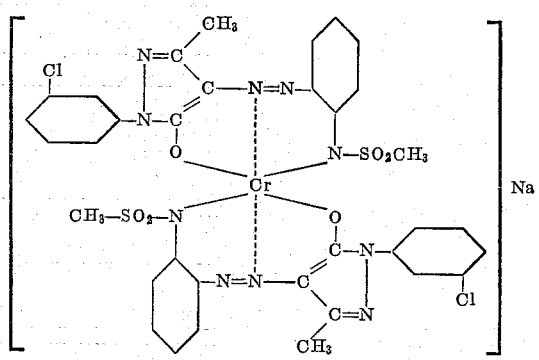

4. The dye of the formula

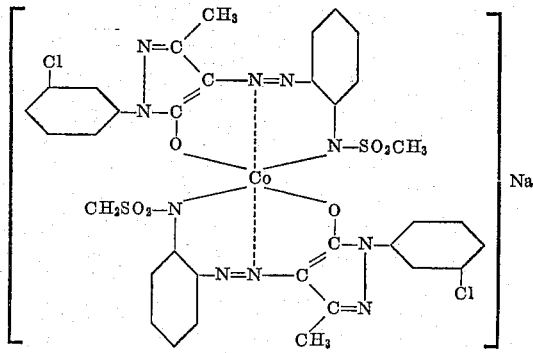

5. The dye of the formula
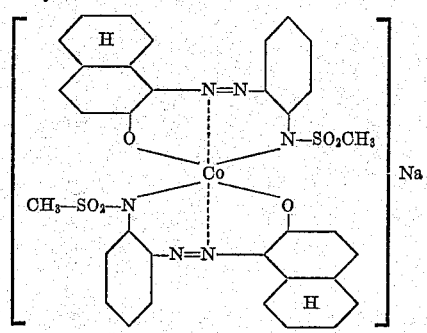
6. The dye of the formula
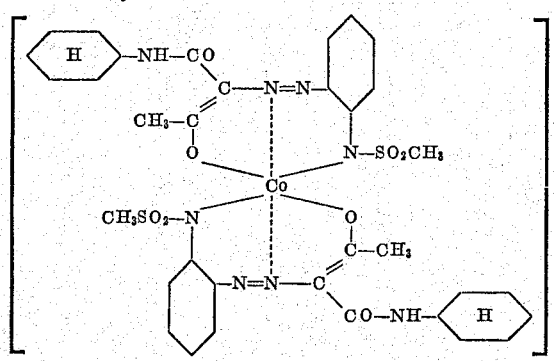
7. The dye of the formula
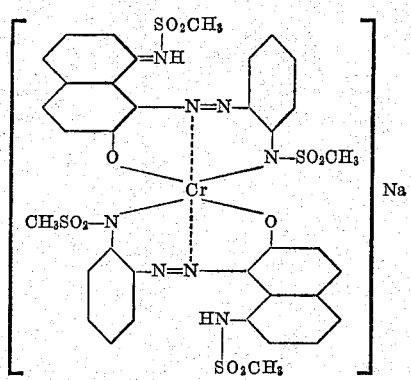
References Cited in the file of this patent
UNITED STATES PATENTS
| | | |
|---|---|---|
| 2,103,804 | Wehrli | Dec. 28, 1937 |
| 2,182,055 | Schweitzer | Dec. 5, 1939 |
| 2,446,662 | Nies | Aug. 10, 1948 |
| 2,839,521 | Schetty | June 17, 1958 |
FOREIGN PATENTS
| | | |
|---|---|---|
| 1,167,799 | France | Aug. 18, 1958 |